UNITED STATES PATENT OFFICE.

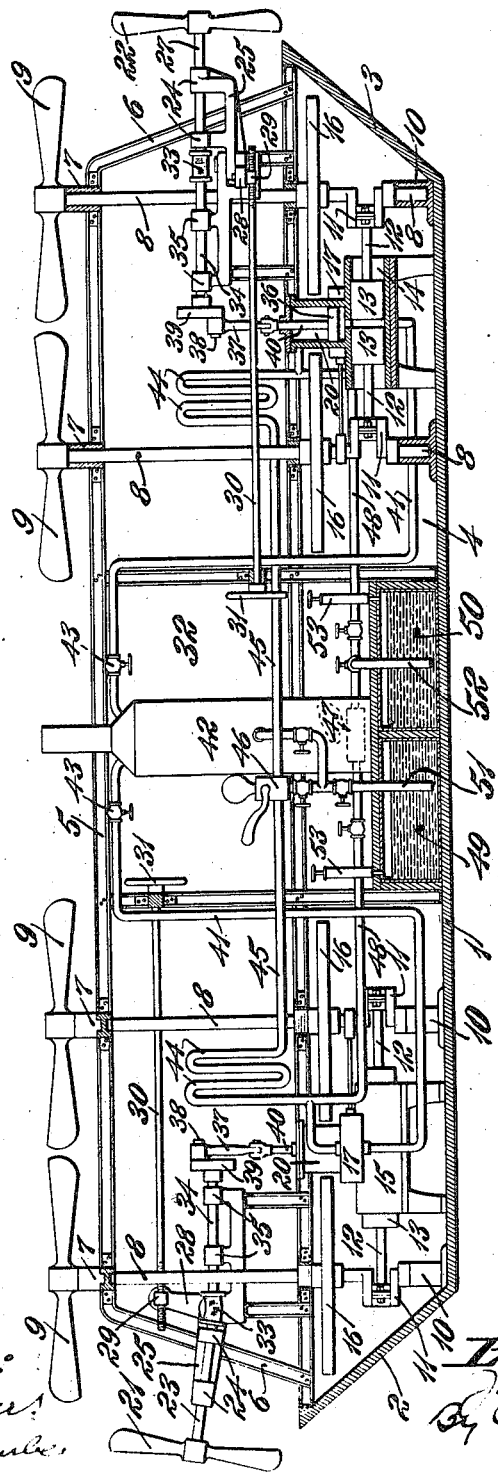

JOHN COOPER PORTER, OF NORTHAMPTON, MASSACHUSETTS.

AEROSTAT.

1,149,218.   Specification of Letters Patent.   Patented Aug. 10, 1915.

Application filed September 3, 1913. Serial No. 787,860.

*To all whom it may concern:*

Be it known that I, JOHN COOPER PORTER, a citizen of the United States, and a resident of the town of Northampton and State of Massachusetts, and having a place of business at St. Louis, Missouri, have invented a new and useful Improvement in Aerostats, of which the following is a specification.

This invention relates to aerostats of the type wherein rotating air propellers provide not only the forward driving means but also the lifting and sustaining means.

The object of the invention is to lessen the dangers of aeronautics whereby the navigation of the air may be practised with certainty and in comparative safety.

This invention has been devised for enabling aerial navigation to be accomplished by means of direct action upon the air as by means of a screw propeller, instead of gliding thereon subject to the inequalities of the wind; and with its gyroscopes and hull the invention is especially designed for steadily flying slowly or rapidly at slight elevation, with safety, over rivers, canals, or other bodies of water,—and for sailing or floating thereon,—so as to avoid the inevitable anxiety caused by liability to fatal accident in all overland flights, although it is constructed for flying at any reasonable speed or altitude.

To this end the invention consists in an aerostat provided with a very light shallow draft hull, capable of supporting the craft in water, and gyroscopes to maintain its stability, enabling it to fly swiftly at a few feet above the water without danger, and to readily stop thereon or to start therefrom, and would be especially useful in flights over the rivers and bodies of water immediately about all our larger cities and at summer resorts.

This invention also embodies a plurality of gyroscopes for maintaining the longitudinal and lateral stability of the aerostat and securing a constantly steady horizontal position.

The uncertainties of operation and unreliability of performance of explosion motors, together with the attendant danger of fire, have been overcome in my invention by the use therein as the source of motive power of an improved fluid pressure engine operated by the expansive force of naphtha, alcohol, ether or other vapor, produced by heating the liquid in a pressure boiler.

Further objects and results of the invention appear in connection with the following description of the embodiment thereof shown in the accompanying drawing, which forms part of this specification; and in what the invention consists is particularly pointed out in the appended claims.

In the drawing, in which the device is depicted partly in longitudinal section and partly in side elevation, the hull being shown only in section, the several parts are designated by reference characters by which they are referred to herein, the same characters being used to designate like parts, respectively.

Referring to the drawing, the hull 1 has a flat bottom, slanting upward at the bow 2 and stern 3, and nearly straight side walls 4. A fore and aft skeleton framework 5 is supported above the hull by means of inclined braces 6. This framework is provided with bearings 7 for the upper ends of the vertical shafts 8 which carry the four elevating propellers 9. The lower ends of the shafts 8 are supported in step bearings 10 fixed to the bottom of the hull. The shafts 8 are provided with cranks 11, to which are connected driving rods 12. The driving rods extend in opposite directions from the respective oppositely arranged pistons 13 in the horizontal cylinders 14 of the three cylinder fluid pressure engines 15 which are positioned between each pair of propeller shafts. The horizontal cylinders of the engines 15 are single acting, that is, they take steam on one side only of their respective pistons, and all three cylinders of each engine are controlled by a single fluid pressure distributing means 17. The fluid pressure distributing means may be operated by fluid pressure from one of the cylinders, as shown in my pending application for fluid pressure engines. The gyroscope fly wheels 16 on the shafts 8 insure the smooth running of the engines.

The third cylinder 20 of each engine is vertically arranged over the middle of the horizontal cylinder 14 thereof. The vertical cylinder of the forward engine drives the bow propeller 21, and the vertical cylinder of the after engine drives the stern propeller 22. The bow propeller is mounted on the forward end of the shaft section 23, which is mounted in journals 24 carried on a bracket 25 pivotally mounted at its rear end to swing in a vertical circle. The stern propeller is mounted on the rear end of a similar shaft section 27, carried on a similar bracket pivotally mounted to swing in a horizontal circle. The bow and stern propellers are swung in their respective directions by means of arms 28 upon the brackets 25, which arms are provided with rotatable pins 29 threaded for engagement with the threaded outer ends of horizontal rods 30, the inner ends of which carry hand wheels 31 in proximity to the cock-pit 32 amidships.

Universal joints 33 connect the shaft sections 23 and 27 for the bow and stern propellers with their respective driving shaft sections 34. The latter are mounted in fixed journals 35 supported by the frame of the craft, and are driven from pistons 36 in the cylinders 20 by means of driving rods 37 attached to the piston rods 40 and connected to crank pins 38 carried by disks 39 which are fixed on the inner ends of the shafts 34. The cylinders 20 are double acting, because the crank disks 39 should be made small in order to avoid gyroscopic action therein which might interfere with the proper behavior or prevent easy handling of the craft.

The fluid pressure for the engine is supplied through pressure pipes 41 from a boiler 42 located in the cock-pit. Throttle valves 43 are placed in the pipes 41 between the boiler and the engines for controlling the speed of the engines. The exhaust vapor from the engines is piped to a condenser 44, from which the condensed fluid may be pumped back to the boiler through a return pipe 45 fitted with a force pump 46. If desired, the uncondensed vapor from the engines may be conducted by means of pipes 48 directly to the burner 47 under the boiler for heating the latter and vaporizing the motive fluid.

Fuel tanks 49, 50 are provided for storing a reserve supply of motive fluid, or liquid fuel for the burner. The fluids in the storage tanks may be forced through the pipes 51, 52 to the boiler and burner by means of the pressure of compressed air pumped into the tanks by air force pumps 53.

It is evident from the foregoing description that an aerostat constructed in accordance with this invention can be navigated above the surface of any body of water in comparative safety. Rapids, dams, or other obstructions in or on the water may be avoided by passing over them, and in case of trouble with the mechanism while in the air the aerostat will immediately settle upon the surface of the water. This device is entirely capable of navigating the air at high speed, and of ascending to great heights, either above the water or above the land, but is designed chiefly for flights at safely low elevations over the smooth waters with which our country is so plentifully supplied.

What I claim as my invention is as follows:

1. An aerostat comprising a hull adapted to float on the water, a pair of elevating propellers mounted at the upper ends of parallel vertical shafts, provided with cranks near their lower ends, a horizontal fluid pressure cylinder mounted in said hull between said shafts, said cylinder having two oppositely facing pistons arranged therein, and driving rods attached to said pistons and connected to the cranks of said shafts to rotate the latter.

2. An aerostat comprising steering and propelling means, a pair of gyroscope wheels mounted on parallel vertical shafts for rotation in horizontal planes, elevating propellers mounted at the upper ends of said shafts, the lower ends of said shafts being cranked, and a horizontal fluid pressure cylinder mounted between the lower ends of said shafts, said cylinder having two oppositely facing pistons arranged therein and operatively connected to said cranks to rotate said gyroscopes and propellers.

3. An aerostat comprising steering and propelling means, a pair of parallel vertical crank shafts having gyroscope wheels fixed thereon and adapted to rotate in the same horizontal plane, elevating propellers mounted at the upper ends of said shafts, and a horizontal fluid pressure cylinder mounted between said shafts, said cylinder having two oppositely facing pistons arranged therein and connected to the cranks of said shafts to rotate the latter.

4. An aerostat comprising a hull adapted to float on the water, a framework erected upon said hull and supporting parallel vertical crank shafts, a plurality of pairs of elevating propellers mounted at the upper ends of said shafts, and a horizontal fluid pressure cylinder mounted between the shafts of each of said pairs of shafts, each of said cylinders having two oppositely facing pistons arranged therein and connected to the cranks of said shafts, respectively, to rotate the latter, and a third cylinder operating in synchronism with said horizontal cylinders, said last named cylinder containing a double acting piston for rotating a horizontal propeller shaft unprovided with a gyroscope wheel.

5. In an aerostat, in combination with a hull, one or more pairs of elevating propellers, driven by vertical shafts having step bearings in said hull, each shaft carrying a gyroscope, and being operated by fluid pressure upon one of two oppositely facing pistons in a single cylinder.

6. In an aerostat, in combination with a hull, one or more pairs of elevating propellers driven by vertical shafts having step bearings in said hull, each shaft carrying a gyroscope, and being operated by fluid pressure upon a piston in a three piston engine, which engine also operates either a driving or steering propeller.

Signed at St. Louis, Mo., this 1st day of September, 1913.

JOHN COOPER PORTER.

Witnesses:
ANDREW P. KESSLING,
M. A. SHELTON.